(12) United States Patent
Gibson et al.

(10) Patent No.: US 11,248,367 B2
(45) Date of Patent: Feb. 15, 2022

(54) HYDRANT NOZZLE CAP SPACER

(71) Applicant: Mueller International, LLC, Atlanta, GA (US)

(72) Inventors: Daryl Lee Gibson, Cleveland, TN (US); Bruce Robertson, Toronto (CA); Mohammad Hassan Sobhani, Burlington (CA)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 16/807,928

(22) Filed: Mar. 3, 2020

(65) Prior Publication Data
US 2021/0277635 A1    Sep. 9, 2021

(51) Int. Cl.
*E03B 9/06* (2006.01)
*F16L 15/08* (2006.01)
*F16F 1/32* (2006.01)
*F16L 55/115* (2006.01)

(52) U.S. Cl.
CPC .............. *E03B 9/06* (2013.01); *F16F 1/326* (2013.01); *F16L 15/08* (2013.01); *F16L 55/1155* (2013.01)

(58) Field of Classification Search
CPC ....... F16L 55/1155; F16L 15/08; F16L 19/08; F16L 19/10; F16L 19/106; F16J 15/028; F16F 1/028; F16F 1/324; F16F 1/326; E03B 9/06
USPC ............................ 285/14, 383; 267/161–163
See application file for complete search history.

(56) References Cited

U.S. PATENT DOCUMENTS

| | | | | |
|---|---|---|---|---|
| 1,903,391 A | * | 4/1933 | Snell | .................... F01P 11/0214 220/302 |
| 2,191,579 A | * | 2/1940 | Nelson | .................. F16L 37/127 285/320 |
| 2,447,060 A | * | 8/1948 | Franck | .................... F16L 19/10 285/341 |
| 3,075,202 A | | 1/1963 | Rubio | |
| 3,115,804 A | | 12/1963 | Johnson | |
| 3,589,703 A | * | 6/1971 | Brookman | .............. F16K 15/12 267/162 |
| 4,141,574 A | * | 2/1979 | Stansifer | ................... E03B 9/02 137/296 |
| 4,813,569 A | * | 3/1989 | Ruiz | ................... F16L 55/1108 138/89 |

(Continued)

FOREIGN PATENT DOCUMENTS

| | | |
|---|---|---|
| CA | 3057202 | 5/2021 |
| CN | 213800 | 7/1993 |
| WO | 2021178181 | 9/2021 |

OTHER PUBLICATIONS

Gibson, Daryl Lee; International Search Report and Written Opinion for PCT Application No. PCT/US21/19453, filed Feb. 24, 2021, dated May 6, 2021, 8 pgs.

*Primary Examiner* — Kevin F Murphy
(74) *Attorney, Agent, or Firm* — Taylor English Duma LLP

(57) ABSTRACT

Example aspects of a nozzle cap spacer for a hydrant nozzle cap, a spaced nozzle cap assembly, and a method for adjusting a rotational indexing of a nozzle cap are disclosed. The nozzle cap spacer for a hydrant nozzle cap can comprise a spacer body defining an outer body edge; and a resilient first spacer spring arm extending from the outer body edge, wherein the first spacer spring arm is biased away from the spacer body in an extended orientation.

22 Claims, 7 Drawing Sheets

(56) References Cited

U.S. PATENT DOCUMENTS

| | | | | |
|---|---|---|---|---|
| 6,816,072 B2* | 11/2004 | Zoratti | ................... | A62C 31/28 |
| | | | | 137/272 |
| 8,919,606 B2* | 12/2014 | Sato | ........................ | F16J 13/14 |
| | | | | 220/802 |
| 2013/0056538 A1* | 3/2013 | Binmore | ................. | E21B 47/01 |
| | | | | 235/492 |
| 2017/0080824 A1 | 3/2017 | Jinka et al. | | |
| 2017/0237158 A1 | 8/2017 | Gibson | | |

* cited by examiner

HYDRANT NOZZLE CAP SPACER

TECHNICAL FIELD

This disclosure relates to fire hydrants. More specifically, this disclosure relates to a spacer for a hydrant nozzle cap.

BACKGROUND

Fire hydrants are commonly connected to fluid systems, such as municipal water infrastructure systems and water mains, through standpipes. A leak detection system may be provided for detecting leaks in the fluid system and can be attached to a nozzle cap, and the nozzle cap be attached to a nozzle of the fire hydrant. Leak detection systems often comprise an antenna, which should be appropriately oriented for ideal transmission and reception of signal. A gasket may be positioned between the nozzle cap and the fire hydrant to adjust the rotational indexing of the nozzle cap relative to the fire hydrant, thus adjusting the orientation of the antenna.

In some fire hydrants, such as some wet barrel hydrants, a leak path might be provided in the nozzle cap to allow water or air to leak out the nozzle cap, relieving pressure between the nozzle and the nozzle cap when the nozzle is closed after use. In some aspects, the leakage of water out of the nozzle cap can indicate that a valve within the nozzle is not fully closed. However, a gasket for sealing the nozzle cap with the nozzle can resiliently deform into the leak path, blocking water from draining out of the nozzle cap and preventing the pressure therein from being reduced.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a nozzle cap spacer for a hydrant nozzle cap comprising a spacer body defining an outer body edge; and a resilient first spacer spring arm extending from the outer body edge, wherein the first spacer spring arm is biased away from the spacer body in an extended orientation.

Also disclosed is a spaced nozzle cap assembly comprising a nozzle cap comprising a cap body, the cap body comprising a bore sidewall defining a threaded bore; and a nozzle cap spacer comprising a spacer body and a spacer spring arm extending from the spacer body, the nozzle cap spacer received within the threaded bore, the spacer spring arm engaging the bore sidewall.

Also disclosed is a method for adjusting a rotational indexing of a nozzle cap, the method comprising providing a nozzle cap and nozzle connector, the nozzle cap defining a threaded bore; inserting a nozzle cap spacer into the threaded bore to adjust a rotational indexing of the nozzle cap relative to the nozzle connector; and connecting the nozzle cap to the nozzle connector.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Figure 1:
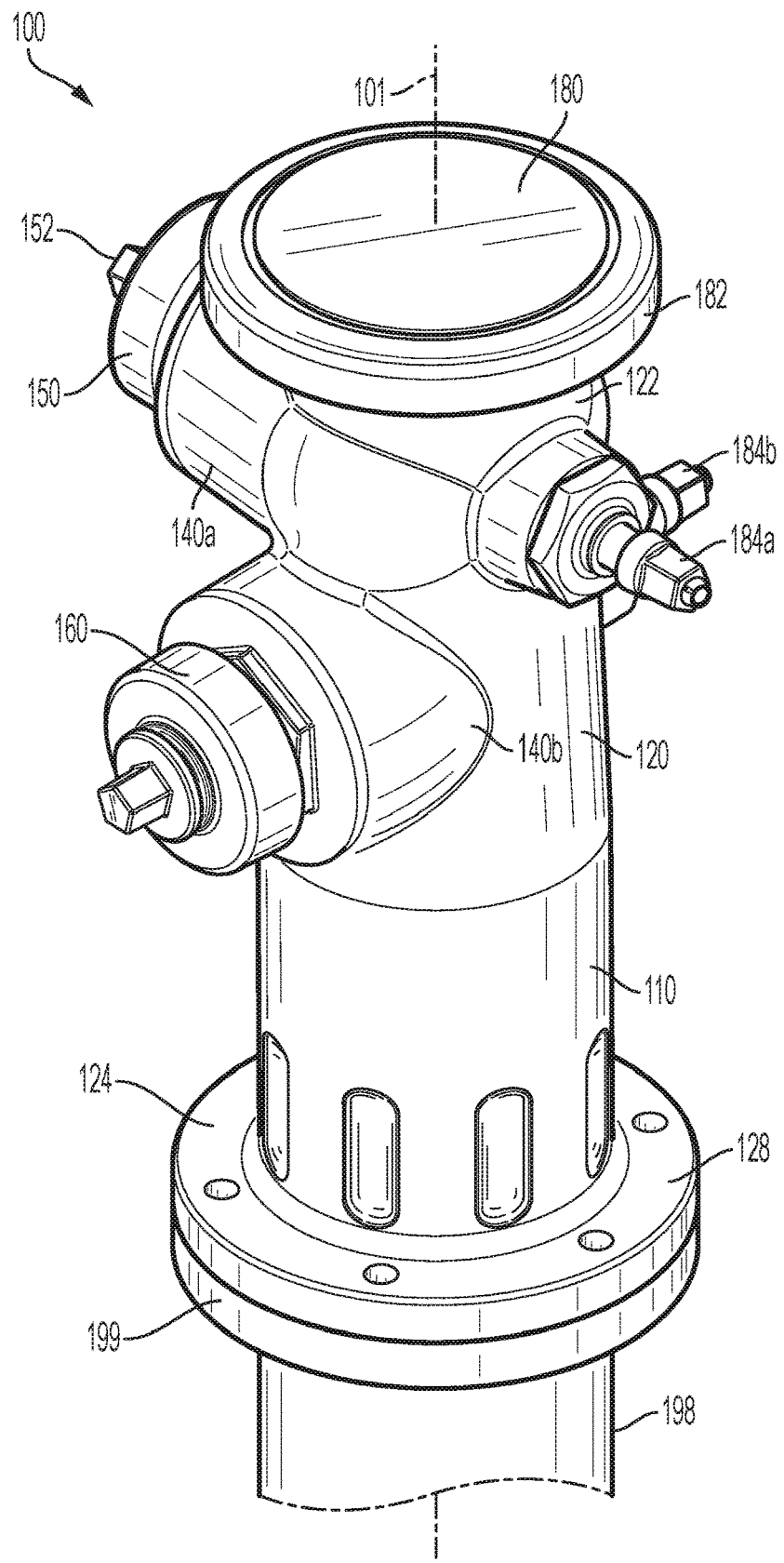
FIG. 1 is a front perspective view of a hydrant assembly comprising a nozzle cap connected to a nozzle of a fire hydrant, in accordance with one aspect of the present disclosure.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutations of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed in the present application is a nozzle cap spacer for a hydrant nozzle cap and associated methods, systems, devices, and various apparatus. Example aspects of the nozzle cap spacer can define a spacer body and one or more spacer spring arms extending outwardly therefrom. The nozzle cap spacer can be configured to be generally received between a hydrant nozzle cap and a hydrant nozzle to adjust the rotational indexing of the hydrant nozzle cap relative to the hydrant nozzle. It would be understood by one of skill in the art that the disclosed nozzle cap spacer is described in but a few exemplary aspects among many. No particular terminology or description should be considered limiting on the disclosure or the scope of any claims issuing therefrom.

FIG. 1 is a perspective view of a hydrant assembly 100 comprising a fire hydrant 110 and a nozzle cap 150, in accordance with one aspect of the present disclosure. Example aspects of the fire hydrant 110 can be a wet barrel hydrant, as shown; however, in other aspects, the fire hydrant 110 can be any other type of hydrant known in the art, such as, for example, a dry barrel hydrant. The fire hydrant 110 can comprise a barrel 120, one or more nozzles 140a,b, and, in some aspects, a hydrant cap 180, as shown. In other aspects, no hydrant cap 180 is present and the barrel 120 can be closed at a top barrel end 122 of the barrel 120. In a wet barrel hydrant, water can be housed within the barrel 120 at all times, even when the fire hydrant 110 is not in use. Each of the nozzles 140a,b can have its own independent valve (not shown) to prevent or allow water flow to the respective nozzle 140a,b. In a dry barrel hydrant, the barrel 120 can be drained of water when the fire hydrant 110 is not in use, and the valve for preventing or allowing water flow to the nozzles 140a,b can be housed below ground, such that water will not freeze in the barrel 120 in cold conditions. The barrel 120 can define a top barrel end 122 and a bottom barrel end 124 disposed opposite from the top barrel end 122. The barrel 120 can be substantially tubular and can define a barrel axis 101 extending from the top barrel end 122 to the bottom barrel end 124. In the present aspect, the barrel axis 101 can be substantially vertically aligned.

The barrel 120 can comprise a base flange 128 disposed at the bottom barrel end 124. The base flange 128 can be fastened to a standpipe flange 199 of a standpipe 198 of a fluid system (not shown), such as a water main, for example and without limitation. Example aspects of the standpipe 198 can be formed from a metal material, such as, for example, iron or steel. Other aspects of the standpipe 198 can be formed from any other suitable material known in the art. The base flange 128 of the barrel 120 can be fastened to the standpipe flange 199 by a plurality of fasteners (not shown), for example, or by any other suitable connection method known in the art. A cap flange 182 of the hydrant cap 180 can be attached to the top barrel end 122 of the barrel 120 with a plurality of fasteners (not shown), by threaded engagement, or my any other suitable connection method known in the art. In other aspects, the cap flange 182 can be fastened to the top barrel end 122 and/or the base flange 128 can be fastened to the standpipe flange 199 by any other suitable fasteners known in the art, including but not limited to, adhesives, welding, or any suitable mechanical fasteners. Example aspects of the barrel 120 can comprise an first operation nut 184a, or "op nut", positioned opposite the nozzle 140a and nozzle cap 150, which can be rotated to open and close a first valve (not shown) mounted in the nozzle 140a in order to respectively supply or cut off pressurized water flow through the nozzle 140a from the barrel 120. Furthermore, as shown, example aspects of the barrel 120 can further comprise a second operation nut 184b positioned opposite the nozzle 140b, which can be operated to open and close a second valve (not shown) mounted in the nozzle 140b.

According to example aspects, the nozzle cap 150 can be screwed onto the nozzle 140a to seal the nozzle 140a in a sealed orientation. Furthermore, in some aspects, a hose cap 160 can be screwed onto the nozzle 140b to seal the nozzle 140b in a sealed orientation. With the nozzle cap 150 sealing the nozzle 140a, pressurized water from the fluid system cannot escape through the nozzle 140a when the main valve (not shown) is in an open position. As shown, the nozzle cap 150 can define a cap nut 152 that can be turned, such as with a wrench or another suitable tool, to tighten or loosen the nozzle cap 150 on the nozzle 140a. In example aspects, the fire hydrant 110 can be formed from a metal material, such as, for example, iron, and the nozzle 140a can be formed from a metal material such as iron. In other aspects, however, the fire hydrant 110 and/or the nozzle 140a can be formed from any other suitable material or combination of materials known in the art.

In example aspects, the nozzle cap 150 can comprise a leak detection system (not shown). For example, the nozzle cap 150 may comprise a vibration sensor which can be configured to detect leaks within the fluid system by monitoring vibrations travelling up the standpipe 198 and through the fire hydrant 110 when the nozzle cap 150 is mounted on the nozzle 140a. Vibration patterns within the fluid system can indicate the presence of leaks within the fluid system. According to example aspects, the nozzle cap 150 can further comprise an antenna 700 (shown in FIG. 7). The antenna 700 can be configured to transmit a signal outwards from the nozzle cap 150 to convey whether leaks have been identified within the fluid system.

Figure 2:
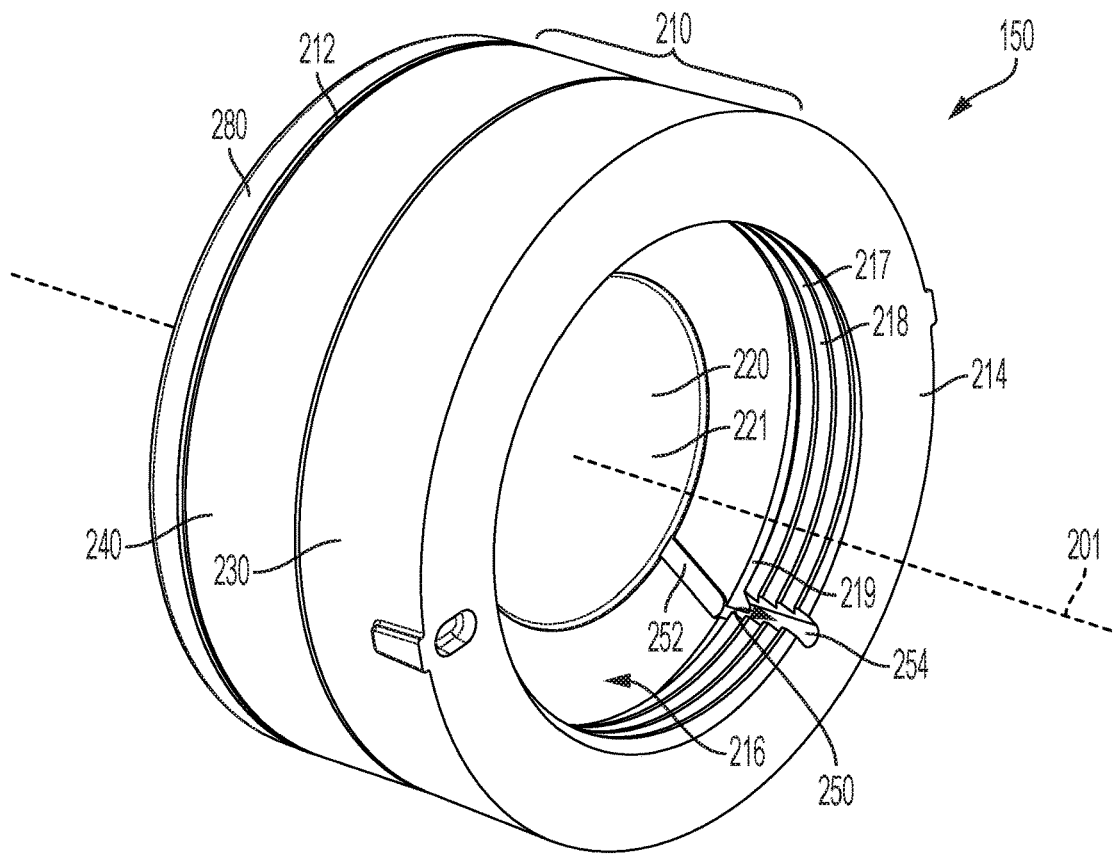
FIG. 2 is a rear perspective view of the nozzle cap of FIG. 1.

FIG. 2 is a perspective rear view of the nozzle cap 150 of the fire hydrant 110 of FIG. 1. The nozzle cap 150 can comprise a cap body 210 and a cap cover 280. Example aspects of the cap cover 280 can be formed from a metal material, such as for example, ductile iron. The cap body 210 can define a first body end 212 and a second body end 214 disposed opposite from the first body end 212. The cap body 210 can further comprise an inner housing 230 and an outer module, such as an outer housing 240. According to example aspects, the inner housing 230 and/or outer housing 240 can be formed from a substantially rigid material. For example, the inner housing 230 can be formed from a metal material, such as, for example, ductile iron, and the outer housing 240 can be formed from a plastic material. Example aspects of the plastic material of the outer housing 240 can be a glass-filled plastic material to provide an improved acoustic performance for the leak detection system. The cap cover 280 can be attached to the first body end 212 of the cap body 210 at the outer housing 240. The inner housing 230 of the cap body 210 can define a threaded bore 216 extending into the cap body 210 from the second body end 214 to an inner wall 220 of the cap body 210. The threaded bore 216 can define a cap axis 201 of the cap body 210, and the cap axis 201 can extend from the first body end 212 to the second body end 214. According to example aspects, the nozzle cap 150 can be a modular system wherein the outer module, such as the outer housing 240, can be easily removed and/or replaced, as desired. For example, it may be desired to remove the outer housing 240 temporarily for repair or to replace the removed outer housing 240 with a new outer housing 240 or a different outer module. For example, the nozzle cap 150 can be similar to the modular nozzle cap disclosed in U.S. patent application Ser. No. 16/428,744, filed May 31, 2019, which is hereby specifically incorporated by reference herein in its entirety.

According to example aspects, the threaded bore 216 can be defined by a bore sidewall 217 comprising internal threading 218, and the threaded bore 216 can be screwed onto the nozzle 140a (shown in FIG. 1), which can be, for example and without limitation, a standard threaded nozzle, to mount the nozzle cap 150 on the nozzle 140a by rotating the nozzle cap 150 about the cap axis 201. In some aspects, as shown, the internal threading 218 may not extend fully from the second body end 214 to the inner wall 220. For example, in the present aspect, the internal threading 218 terminates before reaching the inner wall 220, and an annular recess 219 can be formed in the bore sidewall 217 between the internal threading 218 and the inner wall 220. In the present aspect, the internal threading 218 can be straight threading that does not taper from the second body end 214 towards the inner wall 220. In other aspects, the internal threading 218 can be tapered threading that tapers from the second body end 214 towards the inner wall 220. Moreover, in other aspects the internal threading 218 can instead be formed as external threading.

According to example aspects, as shown in FIG. 2, the nozzle cap 150 can define a leak channel 250 formed therein. In the present aspect, the leak channel 250 can generally define an L-shape. The L-shaped leak channel 250 can comprise a first leak channel segment 252 formed in the inner wall 220 of the cap body 210 and a second leak channel segment 254 formed in the bore sidewall 217 of the threaded bore 216 and extending across the internal threading 218. As shown, the second leak channel segment 254 can extend from the first leak channel segment 252 to the second body end 214 of the cap body 210. Other aspects of the leak channel 250 can define any other suitable shape or configuration. According to example aspects, the leak channel 250 can define a leak path that can allow air or water to leak out of the nozzle cap 150 to relieve pressure between the nozzle cap 150 and the nozzle 140a, such as after the nozzle 140a is closed after use. In some aspects, wherein the valve within the nozzle 140 is not fully or properly closed, pressurized water can flow from the barrel 120 (shown in FIG. 1) through the valve in the nozzle 140a. A small amount of the pressurized water can leak out of the nozzle cap 150 and into the surrounding environment through the leak channel 250 to indicate that the valve is not closed. In some aspects, as shown, the inner wall 220 of the cap body 210 can define a recessed center region 221 that can facilitate allowing water to flow into the leak channel 250 at the first leak channel segment 252.

Figure 3:
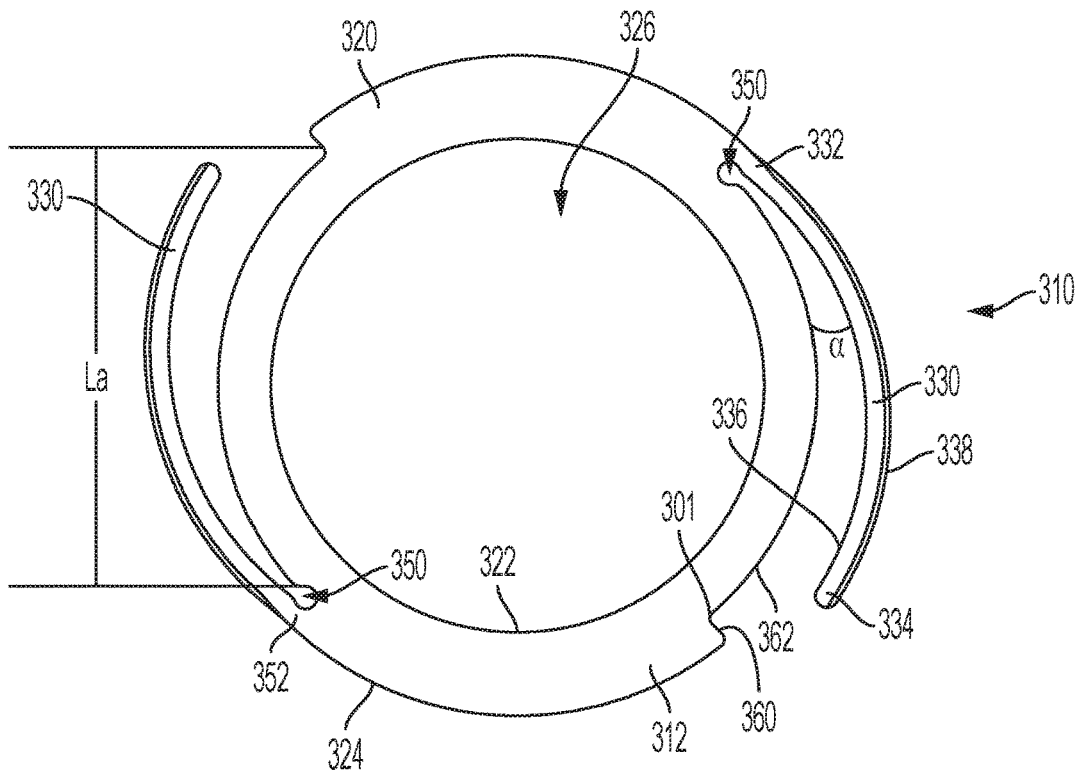
FIG. 3 is a top view of a nozzle cap spacer for use with the nozzle cap of FIG. 1.
Figure 4:
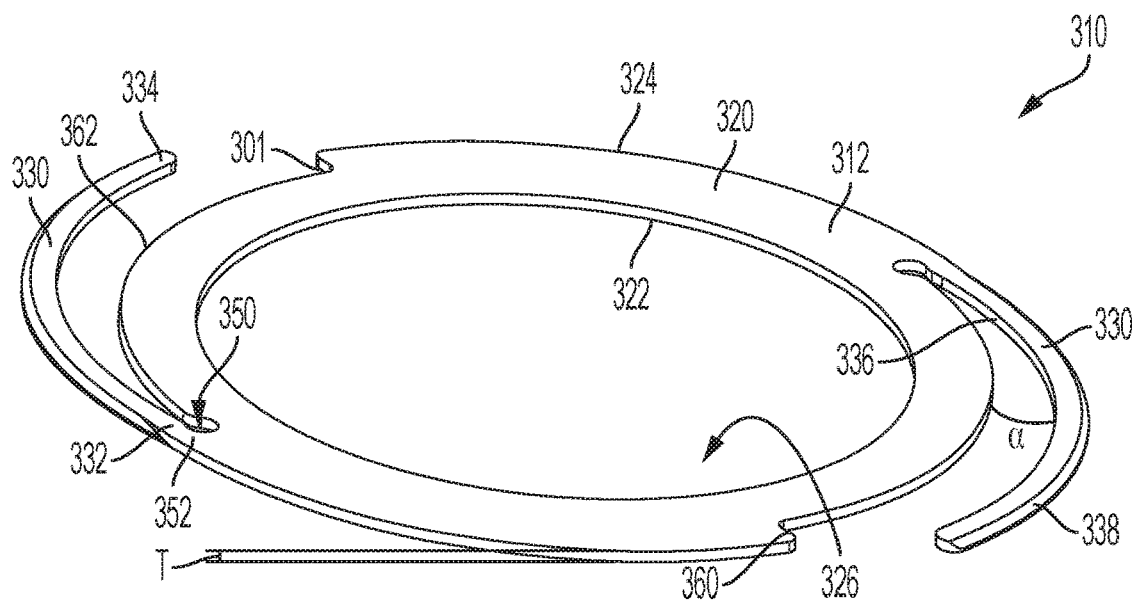
FIG. 4 is a top perspective view of the nozzle cap spacer of FIG. 3.

In various aspects, it can be desired to orient the antenna 700 of the leak detection system in an upward-facing position, wherein the antenna 700 is pointed generally vertically upward (i.e., towards the sky). Referring to FIGS. 3 and 4, in aspects wherein the antenna 700 is not in an upward-facing position when the nozzle cap 150 is mounted to the nozzle 140a, one or more nozzle cap spacers 310 can be provided for selectively adjusting the orientation of the antenna 700 to the desired position (e.g., the upward-facing position). Example aspects of the nozzle cap spacer 310 can define a front spacer surface 312 and a rear spacer surface 514 (shown in FIG. 5). The nozzle cap spacer 310 can define a thickness T (shown in FIG. 4) between the front spacer surface 312 and the rear spacer surface 514. Further, the nozzle cap spacer 310 can comprise a spacer body 320 and one or more spacer spring arms 330 extending outward from the spacer body 320. As shown in the present aspect, the spacer body 320 can define a substantially circular cross-sectional shape, and can generally define a substantially circular inner body edge 322 and a substantially circular outer body edge 324.

The inner body edge 322 can define a body opening 326 formed through a center of the spacer body 320. The spacer spring arms 330 can extend outward from the outer body edge 324 at an acute angle α (e.g., an angle less than 90°), as illustrated. For example, a proximal arm end 332 of each of the spacer spring arms 330 can be connected to the spacer body 320 and a distal arm end 334 of each of the spacer spring arms 330 opposite the proximal arm end 332 can be spaced away from the spacer body 320. As shown, in example aspects, each of the spacer spring arms 330 can be substantially arcuate in shape and can define an arcuate inner arm edge 336 extending from the proximal arm end 332 to the distal arm end 334 and an arcuate outer arm edge 338 extending from the proximal arm end 332 to the distal arm end 334. In the present aspect, the nozzle cap spacer 310 can comprise two spacer spring arms 330 positioned at substantially opposite sides of the spacer body 320; however, in other aspects, the nozzle cap spacer 310 can comprise more or fewer spacer spring arms 330, which can be arranged in any suitable orientation around the outer body edge 324.

In some aspects, the nozzle cap spacer 310 can be formed from a flexible and resilient material, such as, for example and without limitation, a metal material such as steel, such that the spacer spring arms 330 can be naturally biased away from the spacer body 320 in an extended orientation, but can be resiliently deformable towards the spacer body 320. For example, the spacer spring arms 330 can be compressed inward towards the spacer body 320 to a compressed orientation when a sufficient force is applied to the spacer spring arms 330. The compressed orientation can be a fully compressed orientation or a partially compressed orientation. According to example aspects, a notch 350 can be formed proximate to a joint 352 between the spacer body 320 and each spacer spring arm 330 to facilitate flexing of the spacer spring arms 330 at the corresponding joint 352. When fully compressed towards the spacer body 320, the inner arm edge 336 of each spacer spring arm 330 can abut a corresponding length $L_a$ of the outer body edge 324. In the partially compressed orientation (shown in FIG. 6), however, the spacer spring arms 330 may not abut the corresponding length $L_a$ of the outer body edge 324.

Furthermore, in the present aspect, as shown, the diameter of the outer body edge 324 of the spacer body 320 can vary. For example, an inward step 360 can be formed in the outer body edge 324 at a distal length end 301 of each of the lengths $L_a$. As such, the diameter of the outer body edge 324 can be decreased along each of the lengths $L_a$ to define a corresponding body recess 362 the outer body edge 324 generally between the inward step 360 and the notch 350 (i.e., along the length $L_a$). In example aspects, when each of the spacer spring arms 330 is fully compressed towards the spacer body 320, such that the inner arm edge 336 of the spacer spring arm 330 can abut the corresponding length $L_a$ of the outer body edge 324, the spacer spring arm 330 can be generally received within the corresponding body recess 362. Moreover, in some aspects, in the fully compressed orientation, the nozzle cap spacer 310 can define a substantially circular cross-sectional shape defining a substantially consistent nozzle cap spacer outer diameter (not shown).

Figure 5:
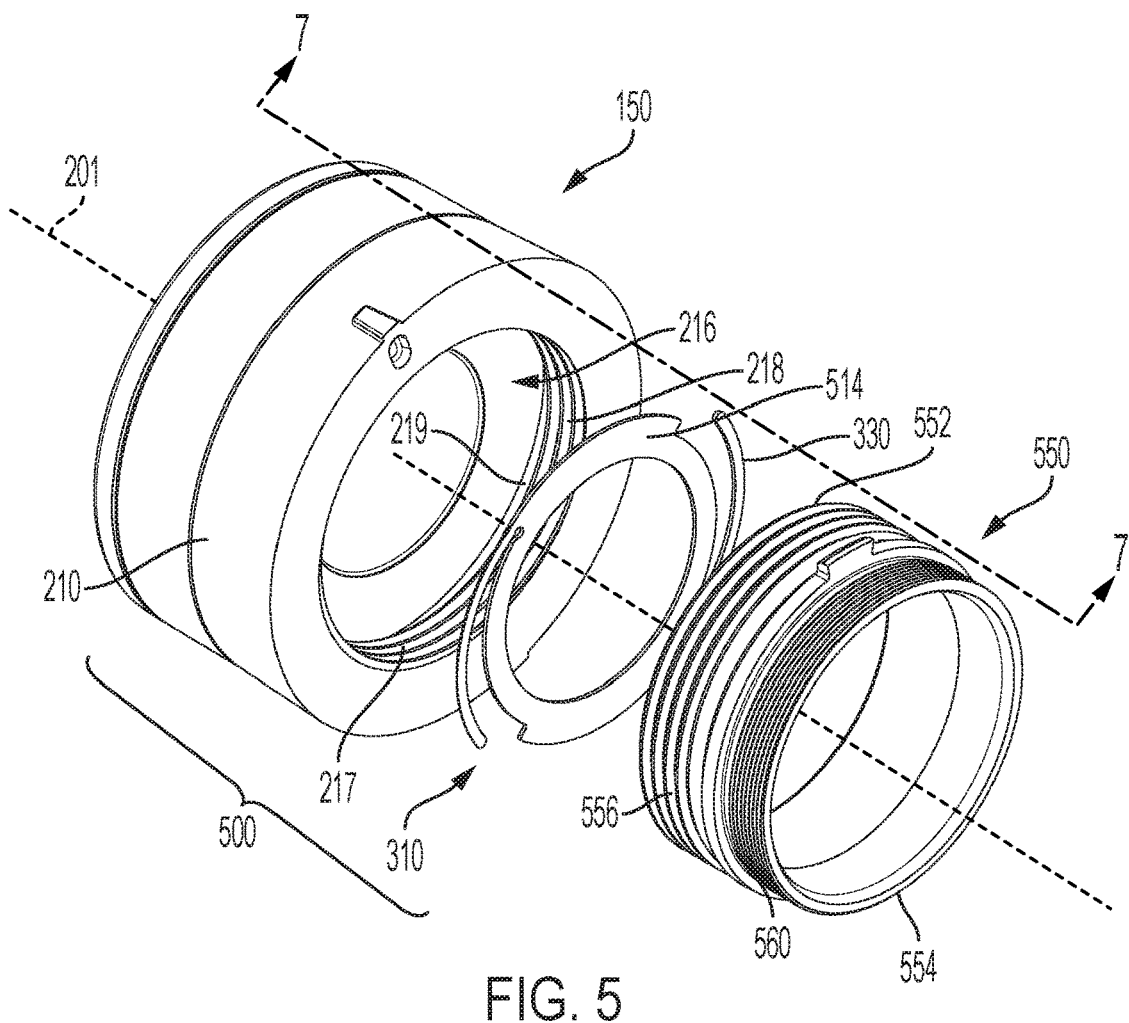
FIG. 5 is a rear exploded view of a nozzle connector of the nozzle of FIG. 1 and a spaced nozzle cap assembly comprising the nozzle cap of FIG. 1 and the nozzle cap spacer of FIG. 3.

FIG. 5 illustrates an exploded view of a spaced nozzle cap assembly 500 comprising the nozzle cap 150 and the nozzle cap spacer 310. As shown, the nozzle cap spacer 310 can be oriented such that it is substantially concentric to the cap axis 201 of the nozzle cap 150. The nozzle cap spacer 310 can be configured to be received within the threaded bore 216 of the cap body 210 and the spacer spring arms 330 can be configured to engage the bore sidewall 217 of the threaded bore 216, as will be shown and described in further detail below with reference to FIG. 6. Furthermore, according to example aspects, the nozzle 140a (shown in FIG. 1) can comprise a nozzle connector 550. The nozzle connector 550 can be substantially cylindrical in shape and can be oriented such that it is substantially concentric to the cap axis 201. Example aspects of the nozzle connector 550 can generally define a first connector end 552 and a second connector end 554. In some aspects, the nozzle connector 550 can be a threaded nozzle connector. For example, the nozzle connector 550 can define external threading 556 configured to mate with the internal threading 218 of the threaded bore 216 of the cap body 210, as will be shown and described in further detail below with reference to FIG. 7.

The external threading 556 of the nozzle connector 550 can extend from the first connector end 552 towards the second connector end 554. In the present aspect, the external threading 556 can be configured to terminate before reaching the second connector end 554. As shown, in some aspects, the nozzle connector 550 may define additional external threading 560 extending from the second connector end 554 towards the external threading 556. The additional external threading 560 can be configured for connecting the nozzle connector 550 to the nozzle 140a (shown in FIG. 1). For example, the additional external threading 560 can be configured to mate with internal threading on the nozzle 140a. In other aspects, the external threading 556 and/or the additional external threading 560 can be formed as internal threading configured to mate with external threading formed on the nozzle cap 150 and/or the nozzle 140a, respectively.

Figure 6:
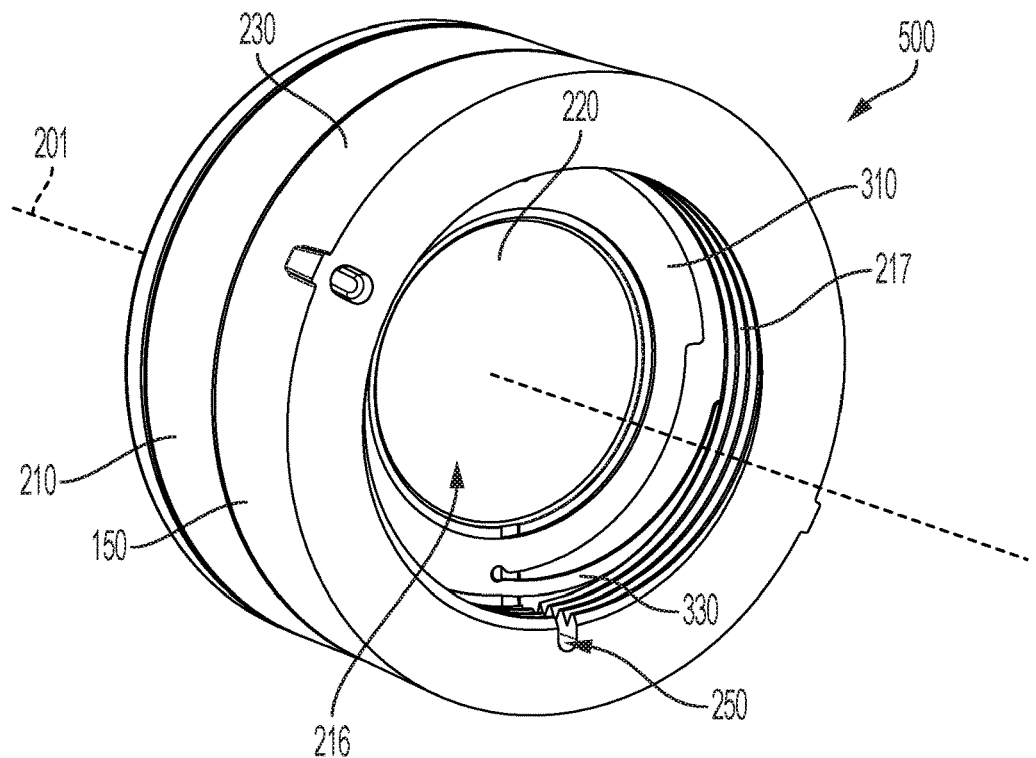
FIG. 6 is a rear perspective view of the spaced nozzle cap assembly of FIG. 5.

FIG. 6 illustrates the spaced nozzle cap assembly 500 comprising the nozzle cap spacer 310 and the nozzle cap 150. As shown, to assemble the nozzle cap spacer 310 with the nozzle cap 150, the nozzle cap spacer 310 can be inserted into the threaded bore 216 of the cap body 210. The front spacer surface 312 (shown in FIG. 3) of the nozzle cap spacer 310 can be configured to abut the inner wall 220 of the cap body 210, and the spacer spring arms 330 can be naturally biased radially outward, relative to the cap axis 201, to engage the bore sidewall 217 of the threaded bore 216 adjacent to the inner wall 220. For example, in the present aspect, the spacer spring arms 330 can be configured to extend into the annular recess 219 (shown in FIG. 2) to engage the bore sidewall 217. In example aspects, the spacer spring arms 330 can be compressed inward during insertion of the nozzle cap spacer 310 into the threaded bore 216 to prevent the spacer spring arms 330 from springing outward before the nozzle cap spacer 310 is properly positioned against the inner wall 220. According to example aspects, the rigid material of the inner housing 230 can prevent the spacer spring arms 330 from widening to the fully extended orientation within the threaded bore 216; and thus, the spacer spring arms 330 can be compressed by the bore sidewall 217 to the partially compressed orientation, as shown, or the fully compressed orientation. According to example aspects, the nozzle cap spacer 310 can be retained in position within the threaded bore 216 by one or more fasteners, such as, for example, adhesives, welding, screws, or any other suitable fastener known in the art. In some aspects, the engagement of the spacer spring arms 330 with the bore sidewall 217 can retain the nozzle cap spacer 310 in position. Moreover, as shown, the nozzle cap spacer 310 can be configured such that it does not interfere with the leak channel 250 when received within the threaded bore 216.

For example, in the present aspect, the nozzle cap spacer 310 can be positioned adjacent to, but does not extend into, the leak channel 250. Thus, pressurized water within the nozzle 140a (shown in FIG. 1) can leak out of the nozzle 140a through the leak channel 250 even with the nozzle cap spacer 310 engaged with the nozzle cap 150.

Figure 7:
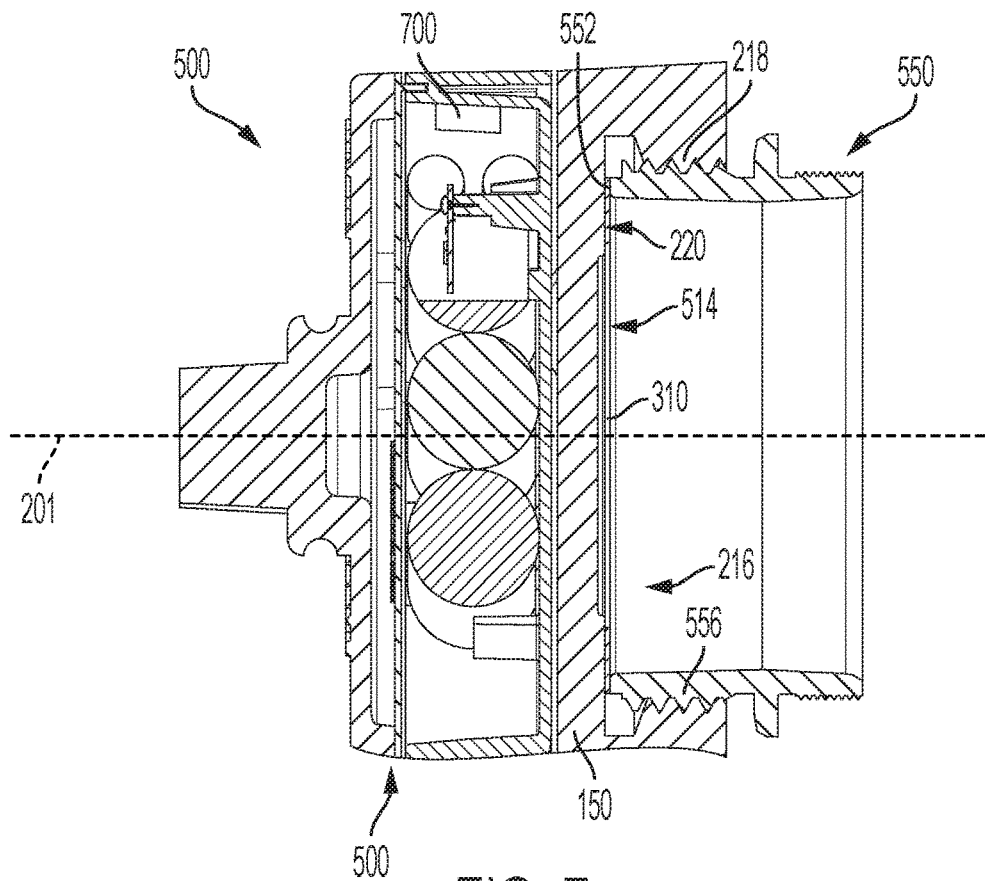
FIG. 7 is a cross-sectional view of the spaced nozzle cap assembly of FIG. 5 engaged with the nozzle connector of FIG. 5 taken along line 7-7 in FIG. 5.

FIG. 7 illustrates a cross-sectional view of the spaced nozzle cap assembly 500 engaged with the nozzle connector 550 of the nozzle 140a (shown in FIG. 1) assembled and taken along line 7-7 in FIG. 5. According to example aspects, the nozzle cap spacer 310 can be configured to alter a rotational indexing of the nozzle cap 150 relative to the nozzle 140a when received within the threaded bore 216. For example, in an aspect wherein the internal threading 218 of the threaded bore 216 is right-handed threading, the nozzle cap 150 can be tightened onto the nozzle connector 550 of the nozzle 140a by rotating the nozzle cap 150 in a clockwise direction about the cap axis 201. In aspects not comprising the nozzle cap spacer 310, the first connector end 552 of the nozzle connector 550 can be configured to abut the inner wall 220 to form a seal between the nozzle 140a (shown in FIG. 1) and the nozzle cap 150. However, in such an aspect, the nozzle cap 150 may be oriented in an undesirable position when tightened onto the nozzle 140a (e.g., the antenna 700 may not be oriented in the desired upward-facing position). As such, it may be necessary to re-orient the nozzle cap 150 in a more desirable position while still maintaining the seal between the nozzle cap 150 and the nozzle 140a.

The nozzle cap spacer 310 can be provided for adjusting the rotational indexing of the nozzle cap 150 relative to the nozzle connector 550 to re-orient the nozzle cap 150 in a more desirable position. As shown, the nozzle cap spacer 310 can be retained within the threaded bore 216 against the inner wall 220 of the nozzle cap 150. The external threading 556 of the nozzle connector 550 can mate with the internal threading 218 of the threaded bore 216, and the nozzle cap 150 can be rotated on the nozzle connector 550 until the first connector end 552 of the nozzle connector 550 abuts the rear spacer surface 514 of the nozzle cap spacer 310. In example aspects, the nozzle cap 150 can be sufficiently tightened to form a seal between the nozzle connector 550 and the spaced nozzle cap assembly 500. According to example aspects, the thickness T (shown in FIG. 4) of the nozzle cap spacer 310 can determine the adjustment in the rotational indexing of the nozzle cap 150 relative to the nozzle connector 550. As such, in some aspects, the thickness T of the nozzle cap spacer 310 may be selected based on the required change in rotational indexing to orient the nozzle cap 150 in a desired position. For example, in one aspect, the antenna 700 may be oriented about 90° from the desired upward-facing position when the nozzle cap 150 is tightened onto the nozzle connector 550 without the nozzle cap spacer 310. As such, it can be required to adjust the rotational indexing of the nozzle cap 150 relative to the nozzle connector 550 by about 90°, and the thickness T of the nozzle cap spacer 310 can be selected based on the required adjustment. In other aspects, a thinner nozzle cap spacer 310 can be selected for adjusting the rotational indexing of the nozzle cap 150 by less than 90° and a thicker nozzle cap spacer 310 can be selected for adjusting the rotational indexing of the nozzle cap 150 by greater than 90°.

Figure 8:
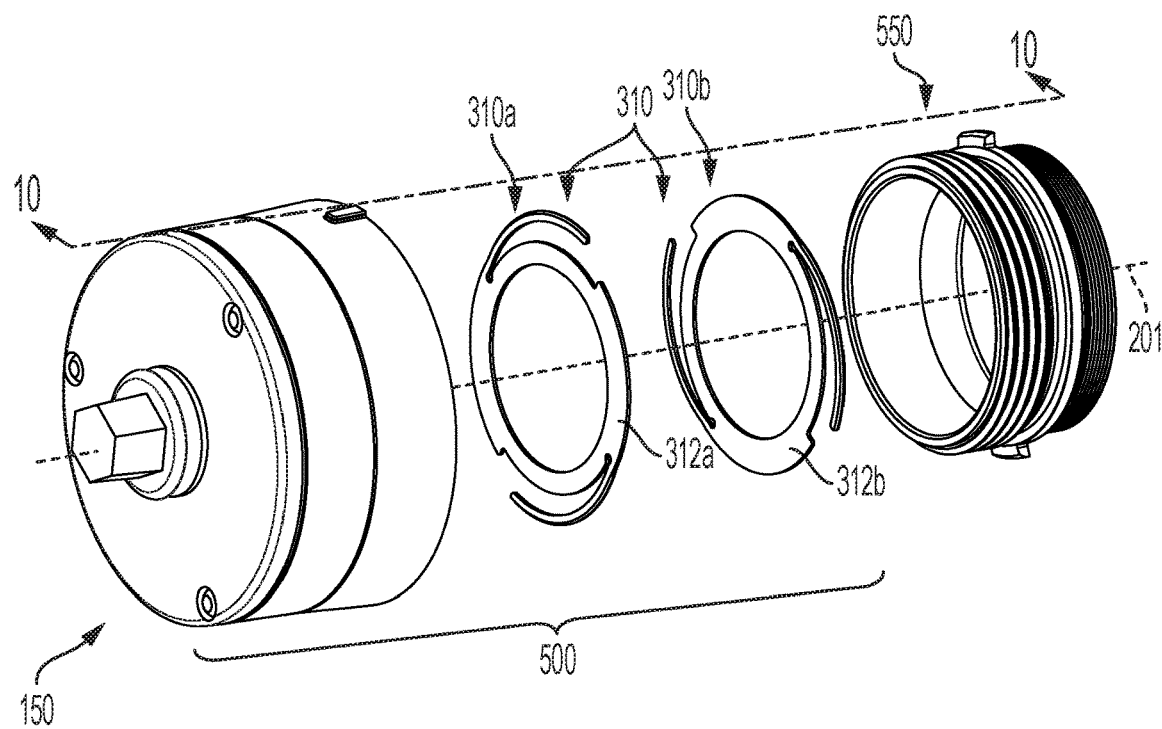
FIG. 8 is a front exploded view of nozzle connector of FIG. 5 and the spaced nozzle cap assembly according to another aspect of the present disclosure, wherein the spaced nozzle cap assembly comprises the nozzle cap of FIG. 1 and a pair of the nozzle cap spacers of FIG. 3.

According to some example aspects, supplementary nozzle cap spacers 310 can be added to the spaced nozzle cap assembly 500 to achieve the desired rotational indexing of the nozzle cap 150 relative to the nozzle connector 550. For example, as shown in the exploded view of FIG. 8, a pair of nozzle cap spacers 310a,b can be provided for increasing the adjustment in the rotational indexing of the nozzle cap 150. In other aspects, more or fewer nozzle cap spacers 310 can be provided as needed for further increasing or lessening, respectively, the rotational indexing. According to example aspects, the number of nozzle cap spacers 310 provided, and/or the thickness T (shown in FIG. 4) of the nozzle cap spacers 310 provided, can be selected based on the required change in rotational indexing to orient the nozzle cap 150 in a desired position. For example, in one aspect, the antenna 700 (shown in FIG. 7) can be oriented about 180° from the desired upward-facing position when the nozzle cap 150 is tightened onto the nozzle connector 550 of the nozzle 140a without the nozzle cap spacers 310a,b. As such, it can be required to adjust the rotational indexing of the nozzle cap 150 relative to the nozzle connector 550 by about 180°. In an instance wherein each nozzle cap spacer 310 defines a thickness T configured to adjust the rotational indexing by about 90°, the pair of the nozzle cap spacers 310a,b can be provided, as shown, such that together the nozzle cap spacers 310a,b can adjust the rotational indexing by about 180°. In other aspects, the spaced nozzle cap assembly 500 can comprise fewer nozzle cap spacers 310 for adjusting the rotational indexing of the nozzle cap 150 by less than 180° or can comprise additional supplementary nozzle cap spacers 310 for adjusting the rotational indexing by greater than 180°. In other aspects, the thickness T of each of the nozzle cap spacers 310 can be configured to adjust the rotational indexing by more or less than 90°. Moreover, in some aspects, the thickness T of the nozzle cap spacers 310 can vary. For example, in an instance wherein it is desired to adjust the rotational indexing of the nozzle cap 150 relative to the nozzle connector 550 by about 120°, the first one of the nozzle cap spacers 310a may be provided comprising a first thickness configured to adjust the rotational indexing by about 90°, and the second one of the nozzle cap spacer 310b may be provided comprising a second, lesser thickness configured to adjust the rotational indexing by about 30°.

Figure 9:
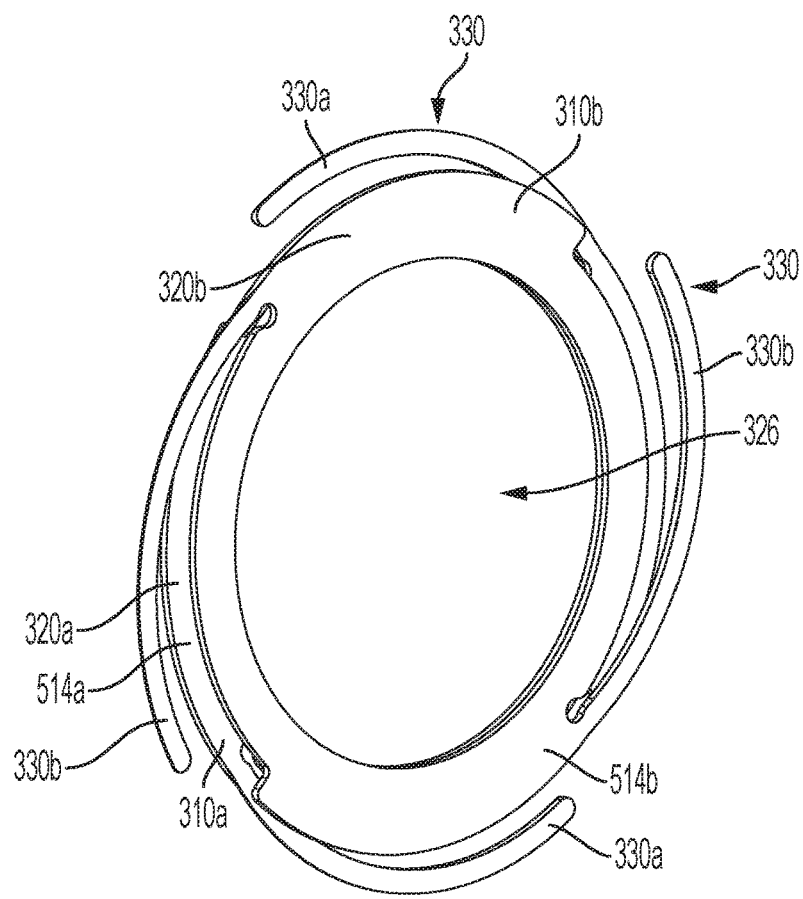
FIG. 9 is a top perspective view of the pair of nozzle cap spacers of FIG. 8 stacked together.

As shown, each of the pair of nozzle cap spacer 310a,b can be oriented such that it is concentric to the cap axis 201. The nozzle cap spacers 310a,b can be generally positioned between the nozzle cap 150 and the nozzle connector 550. FIG. 9 illustrates the pair of nozzle cap spacers 310a,b stacked together for insertion into the threaded bore 216 (shown in FIG. 2) of the nozzle cap 150 (shown in FIG. 1). The rear spacer surface 514a of the first nozzle cap spacer 310a can be configured to abut the front spacer surface 312b (shown in FIG. 8) of the second nozzle cap spacer 310b. The spacer body 320a and body opening 326 of the first nozzle cap spacer 310a can be configured to substantially align with the spacer body 320b and body opening 326, respectively, of the second nozzle cap spacer 310b, as shown. In some aspects, the spacer spring arms 330 of the first and second nozzle cap spacers 310a,b can also be configured to align, though in other aspects, as shown, the spacer spring arms 330 may not be aligned. For example, in the present aspect, the opposing pair of spacer spring arms 330a of the first nozzle cap spacer 310a can extend generally upward and downward from the corresponding spacer body 320a, relative to the orientation shown, and the opposing pair of spacer spring arms 330b of the second nozzle cap spacer 310b can extend generally rightward and leftward from the corresponding spacer body 320b, relative to the orientation shown. As such, each of the spacer spring arms 330a,b can be configured to extend into the annular recess 219 (shown in FIG. 2) and to engage the bore sidewall 217 (shown in FIG. 2) of the threaded bore 216 at a different location.

Figure 10:
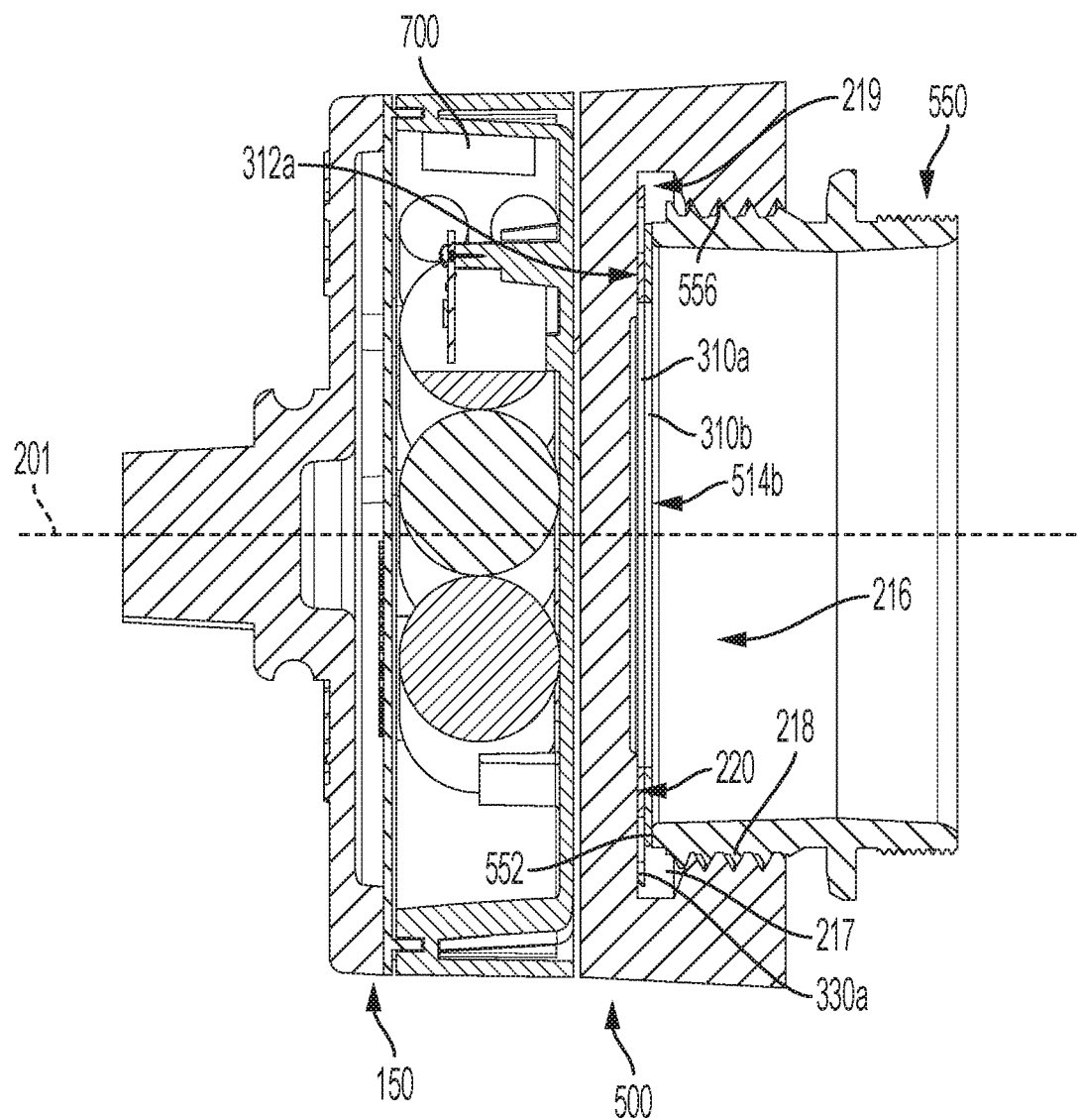
FIG. 10 is a cross-sectional view of the spaced nozzle cap assembly of FIG. 8 engaged with the nozzle connector of FIG. 5 taken along line 10-10 in FIG. 8.

FIG. 10 illustrates a cross-sectional view of the pair of nozzle cap spacers 310a,b assembled with the nozzle cap 150 to define the spaced nozzle cap assembly 500. With the pair of nozzle cap spacers 310a,b inserted into the threaded bore 216 of the nozzle cap 150, the front spacer surface 312a of the first nozzle cap spacer 310a can be configured to abut the inner wall 220 of the nozzle cap 150. The spacer spring arms 330a,b (330b shown in FIG. 9) of the first and second nozzle cap spacers 310a,b can engage the bore sidewall 217 at the annular recess 219 to retain the first and second nozzle cap spacers 310a,b within the threaded bore 216. The external threading 556 of the nozzle connector 550 can engage the internal threading 218 formed on the bore sidewall 217 of the nozzle cap 150, and the nozzle cap 150 can be tightened onto the nozzle connector 550 by rotating the nozzle cap 150 about the cap axis 201, as described above. The nozzle cap 150 can be tightened until the first connector end 552 of the nozzle connector 550 abuts the rear spacer surface 514b of the second nozzle cap spacer 310b. According to example aspects, the nozzle cap 150 can be sufficiently tightened to form a seal between the nozzle connector 550 and the spaced nozzle cap assembly 500. In aspects comprising the pair of nozzle cap spacers 310a,b, the nozzle cap spacers 310a,b can be configured such that they do not interfere with the leak channel 250 (shown in FIG. 2) formed in the inner wall 220 and the bore sidewall 217. Aspects comprising more or fewer nozzle cap spacers 310 can also be configured to not interfere with the leak channel 250.

Figure 11:
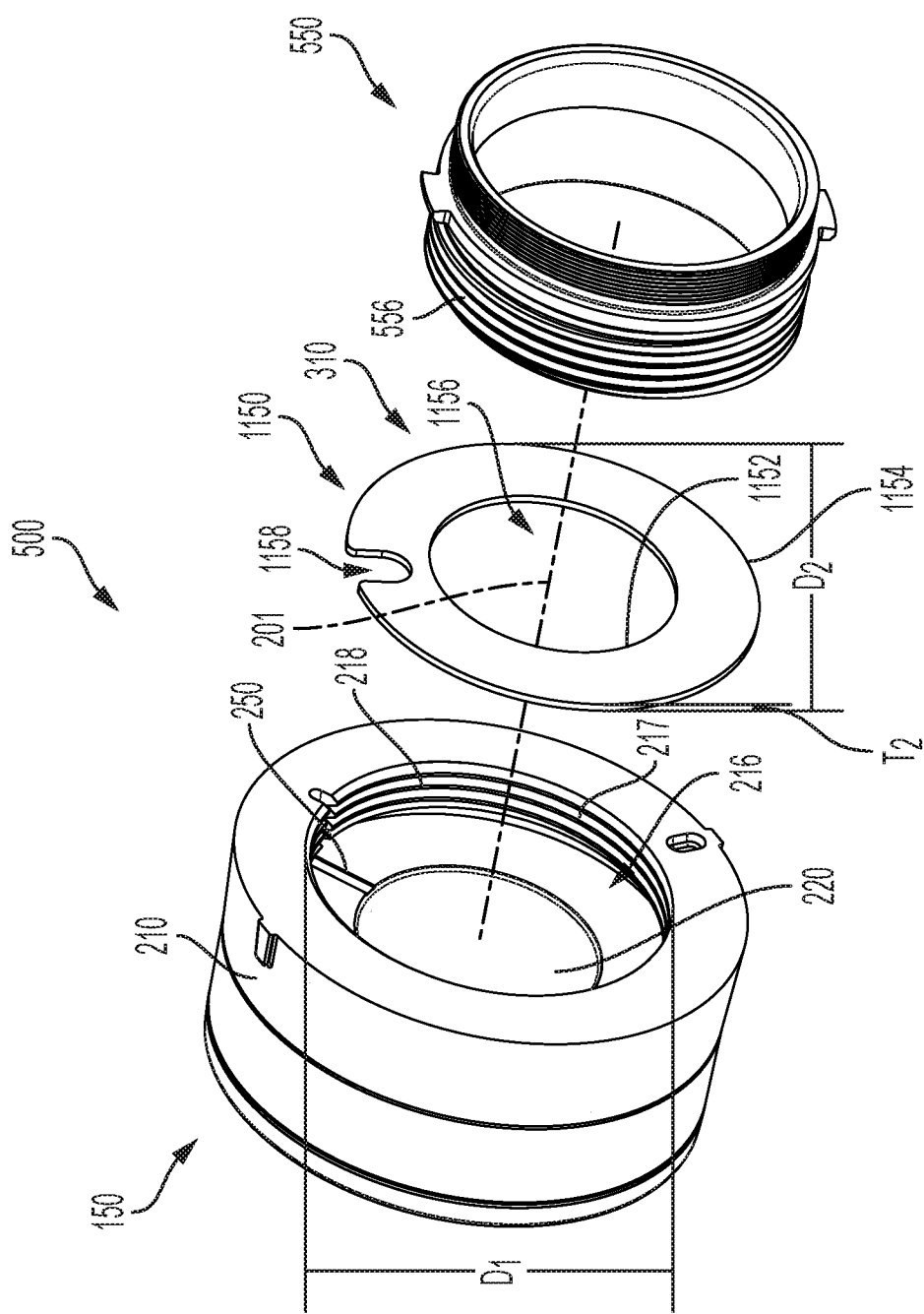
FIG. 11 is a rear exploded view of the nozzle connector of FIG. 1 and the spaced nozzle cap assembly according to another aspect of the disclosure.

FIG. 11 illustrates an exploded view of a spaced nozzle cap assembly 500 comprising the nozzle cap 150 and the nozzle cap spacer 310, according to another aspect of the disclosure. In the present aspect, the nozzle cap spacer 310 can be a gasket spacer 1150 formed from a compressible, resilient material, such as, for example, rubber. In other aspects, the gasket spacer 1150 can be formed from any other suitable material known in the art. As shown, in the present aspect, the gasket spacer 1150 can define a substantially circular cross-sectional shape. The gasket spacer 1150 can further define a substantially circular inner gasket edge 1152 and a substantially circular outer gasket edge 1154, and the inner gasket edge 1152 can define a gasket opening 1156 formed through a center of the gasket spacer 1150. A leak path notch 1158 can be formed in the gasket spacer 1150 extending radially inward from the outer gasket edge 1154, relative to the cap axis 201, as shown. In the present aspect, the leak path notch 1158 can substantially define a U-shaped cross-section; however, in other aspects, the leak path notch 1158 can define any other suitable cross-sectional shape.

As described above, the nozzle cap spacer 310 can be oriented such that it is substantially concentric to the cap axis 201 of the nozzle cap 150. The nozzle cap spacer 310 can be configured to be received within the threaded bore 216 of the cap body 210, in abutment with the inner wall 220 of the cap body 210. In some aspects, the gasket spacer 1150 can be compressed for easy insertion into the threaded bore 216, and can be uncompressed once properly positioned therein. In example aspects, a diameter $D_2$ of the gasket spacer 1150 can be slightly larger than a $D_1$ diameter of the threaded bore 216, such that, when the gasket spacer 1150 is received within the threaded bore 216, it can press against the bore sidewall 217 of the threaded bore 216 and be retained in place by the tension between the gasket spacer 1150 and the bore sidewall 217. In some aspects, the gasket spacer 1150 can also or alternatively be retained in position within the threaded bore 216 by one or more fasteners, such as, for example, adhesives, welding, screws, or any other suitable fastener known in the art.

The nozzle 140a (shown in FIG. 1) can comprise the nozzle connector 550 to which the spaced nozzle cap assembly 500 can be mounted, as described above. For example, the nozzle connector 550 can define the external threading 556 configured to matingly engage the internal threading 218 of the bore sidewall 217. The gasket spacer 1150 can be configured to adjust the rotational indexing of the nozzle cap 150 relative to the nozzle connector 550. While the present aspect illustrates a single gasket spacer 1150, in other aspects, supplementary gasket spacers 1150 can be added to the spaced nozzle cap assembly 500 to achieve the desired rotational indexing of the nozzle cap 150 relative to the nozzle connector 550. As such, in general, more or fewer gasket spacers 1150 can be provided as needed for increasing or lessening, respectively, the rotational indexing of the nozzle cap 150. According to example aspects, the number of gasket spacers 1150 provided, and/or a thickness $T_2$ of the gasket spacers 1150 provided, can be selected based on the required change in rotational indexing to orient the nozzle cap 150 in a desired position.

In some aspects, various aspects of the nozzle cap spacers 310 (e.g., the nozzle cap spacer 310 of FIGS. 3-10 and the gasket spacer 1150 of FIG. 11) can be used in combination to achieve the desired rotational indexing. For example, in a particular aspect, one or more of the nozzle cap spacers 310 of FIGS. 3-10 can be used to position the antenna 700 (shown in FIG. 7) close to the desired orientation. One or more of the gaskets spacers 1150 can then be added to the spaced nozzle cap assembly 500 to fine-tune the rotational indexing of the nozzle cap 150 to position the antenna 700 in the desired orientation. The thickness $T_2$ of the gasket spacer(s) 1150 can be selected based on the rotational indexing required to fine-tune the position of the antenna 700 to the desired orientation.

According to example aspects, the gasket spacer 1150 can be configured such that it does not interfere with the leak channel 250 when received within the threaded bore 216. For example, in the present aspect, when the gasket spacer 1150 is inserted into the threaded bore 216 of the nozzle cap, the gasket spacer 1150 can be oriented such that the leak path notch 1158 of the gasket spacer 1150 can be aligned with the leak channel 250. In aspects comprising multiple gasket spacers 1150, the leak path notch 1158 of each gasket spacer 1150 can be aligned with the leak channel 250. The leak path notch(es) 1158 can be sized and positioned such that, even upon compression of the gasket spacer 1150, for example by the engagement of the outer gasket edge 1154 with the bore sidewall 217 or by the tightening of the spaced nozzle cap assembly 500 on the nozzle connector 550, the leak path notch 1158 can prevent the gasket spacer 1150 from being deformed into the leak channel 250. Thus, pressurized water within the nozzle 140a (shown in FIG. 1) can leak out of the nozzle 140a through the leak channel 250 even with the gasket spacer 1150 engaged with the nozzle cap 150.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A nozzle cap spacer for a hydrant nozzle cap comprising:
a spacer body defining an outer body edge;
a resilient first spacer spring arm extending from the outer body edge, the first spacer spring arm defining a proximal arm end and a distal arm end, the proximal arm end connected to the spacer body, wherein the first spacer spring arm is biased away from the spacer body in an extended orientation, and wherein the first spacer spring arm is substantially coplanar with the spacer body; and
a slot defined between the first spacer spring arm and the outer body edge, wherein a width of the slot between the distal arm end and the outer body edge is greater than a width of the slot between the proximal arm end and the outer body edge.

2. The nozzle cap spacer of claim 1, wherein:
a joint is formed between the first spacer spring arm and the spacer body;
a notch is formed at the joint and is connected to the slot adjacent to the proximal arm end; and
a width of the notch is greater than the width of the slot between the proximal arm end and the outer body edge.

3. The nozzle cap spacer of claim 1, wherein:
the spacer body further defines an inner body edge; and
the inner body edge defines a body opening formed through a center of the spacer body.

4. The nozzle cap spacer of claim 1, wherein the first spacer spring arm extends from the outer body edge at an acute angle.

5. The nozzle cap spacer of claim 1, wherein:
the first spacer spring arm is configurable in the extended orientation and a compressed orientation;
in the compressed orientation, the first spacer spring arm is compressed towards the spacer body; and
the nozzle cap spacer defines a substantially circular shape in the compressed orientation.

6. The nozzle cap spacer of claim 5, wherein:
the outer body edge defines a length ($L_a$) corresponding to the first spacer spring arm;
an inward step is formed at a distal length end of the length ($L_a$); and
a body recess is formed in the outer body edge along the length ($L_a$).

7. The nozzle cap spacer of claim 1, wherein the first spacer spring arm extends from the outer body edge in a radially outward direction.

8. The nozzle cap spacer of claim 1, further comprising a resilient second spacer spring arm extending from the outer body edge opposite the first spacer spring arm, and wherein the second spacer spring arm is substantially planar with the spacer body.

9. The nozzle cap spacer of claim 1, wherein the first spacer spring arm defines a proximal arm end connected to the spacer body, a distal arm end spaced from the spacer body, an arcuate inner arm edge extending from the proximal arm end to the distal arm end and an arcuate outer arm edge extending from the proximal arm end to the distal arm end.

10. A spaced nozzle cap assembly comprising:
a nozzle cap comprising a cap body, the cap body comprising an inner wall and a bore sidewall, the bore sidewall defining a bore terminating at the inner wall, the cap body defining a first body end and a second body end, the bore extending from the second body end of the cap body to the inner wall of the cap body, wherein the bore sidewall defines internal threading and an annular recess, the internal threading extends from the second body end towards the inner wall, and the annular recess is oriented between the internal threading and the inner wall; and
a nozzle cap spacer comprising a spacer body and a spacer spring arm extending substantially radially outward from the spacer body, the nozzle cap spacer received within the bore, the spacer spring arm engaging the bore sidewall, a front spacer surface of the nozzle cap spacer abutting the inner wall, wherein the spacer spring arm extends into the annular recess.

11. The spaced nozzle cap assembly of claim 10, wherein:
the nozzle cap comprises an antenna; and
the nozzle cap spacer is configured to adjust a rotational indexing of the nozzle cap to reorient the antenna.

12. The spaced nozzle cap assembly of claim 10, wherein:
the nozzle cap defines a leak channel; and
the nozzle cap spacer is positioned adjacent to the leak channel but does not extend into the leak channel.

13. The spaced nozzle cap assembly of claim 12, wherein:
the leak channel defines an L-shape and comprises a first leak channel segment and a second leak channel segment;
the first leak channel segment is formed in the inner wall of the cap body; and
the second leak channel segment is formed in a bore sidewall of the cap body and extends from the first leak channel segment to a second body end of the cap body.

14. The spaced nozzle cap assembly of claim 10, wherein the spacer spring arm is configurable in an extended orientation and a compressed orientation, and wherein the bore sidewall biases the spacer spring arm radially inward to the compressed orientation.

15. A method for adjusting a rotational indexing of a nozzle cap comprising:
providing a nozzle cap and nozzle connector, the nozzle cap defining a bore sidewall, the bore sidewall defining a threaded bore;

inserting a nozzle cap spacer into the threaded bore to adjust a rotational indexing of the nozzle cap relative to the nozzle connector, the nozzle cap spacer comprising a spacer body and a spacer spring arm extending substantially radially outward from the spacer body;

engaging the spacer spring arm with the bore sidewall to bias the spacer spring arm radially inward toward the spacer body; and connecting the nozzle cap to the nozzle connector.

16. The method of claim 15, wherein connecting the nozzle cap to the nozzle connector comprises mating internal threading of the threaded bore with external threading of the nozzle connector and rotating the nozzle cap relative to the nozzle connector.

17. The method of claim 15, further comprising inserting a second nozzle cap spacer into the threaded bore to further adjust the rotational indexing of the nozzle cap relative to the nozzle connector.

18. The method of claim 15, further comprising orienting an antenna of the nozzle cap in an upward-facing position.

19. A spaced nozzle cap assembly comprising:

a nozzle cap comprising a cap body, the cap body comprising an inner wall and a bore sidewall, the bore sidewall defining a bore terminating at the inner wall, wherein the nozzle cap comprises an antenna; and a nozzle cap spacer comprising a spacer body and a spacer spring arm extending substantially radially outward from the spacer body, the nozzle cap spacer received within the bore, the spacer spring arm engaging the bore sidewall, wherein the nozzle cap spacer is configured to adjust a rotational indexing of the nozzle cap to reorient the antenna.

20. A spaced nozzle cap assembly comprising:

a nozzle cap comprising a cap body, the cap body comprising an inner wall and a bore sidewall, the bore sidewall defining a bore terminating at the inner wall, wherein the nozzle cap defines a leak channel; and a nozzle cap spacer comprising a spacer body and a spacer spring arm extending substantially radially outward from the spacer body, the nozzle cap spacer received within the bore, the spacer spring arm engaging the bore sidewall, wherein the nozzle cap spacer is positioned adjacent to the leak channel but does not extend into the leak channel.

21. The spaced nozzle cap assembly of claim 20, wherein:

the leak channel defines an L-shape and comprises a first leak channel segment and a second leak channel segment;

the first leak channel segment is formed in the inner wall of the cap body; and the second leak channel segment is formed in a bore sidewall of the cap body and extends from the first leak channel segment to a second body end of the cap body.

22. A spaced nozzle cap assembly comprising:

a nozzle cap comprising a cap body, the cap body comprising an inner wall and a bore sidewall, the bore sidewall defining a bore terminating at the inner wall; and a nozzle cap spacer comprising a spacer body and a spacer spring arm extending substantially radially outward from the spacer body, the nozzle cap spacer received within the bore, the spacer spring arm engaging the bore sidewall;

wherein the spacer spring arm is configurable in an extended orientation and a compressed orientation, and wherein the bore sidewall biases the spacer spring arm radially inward to the compressed orientation.

* * * * *